United States Patent
Mahlab

(10) Patent No.: US 7,068,947 B2
(45) Date of Patent: Jun. 27, 2006

(54) MULTI WAVELENGTH COMMUNICATION APPARATUS

(75) Inventor: Uri Mahlab, Yehuda (IL)

(73) Assignee: ECI Telecom, Ltd., Petach Tikva (IL)

( * ) Notice: Subject to any disclaimer, the term of this patent is extended or adjusted under 35 U.S.C. 154(b) by 679 days.

(21) Appl. No.: 09/967,981

(22) Filed: Oct. 2, 2001

(65) Prior Publication Data

US 2002/0041416 A1    Apr. 11, 2002

(30) Foreign Application Priority Data

Oct. 5, 2000    (IL) .................................... 138865

(51) Int. Cl.
*H04B 10/12*    (2006.01)

(52) U.S. Cl. ...................... 398/183; 398/186

(58) Field of Classification Search ............... 398/201, 398/7, 196, 4, 83, 184–5, 98, 147, 99, 110, 398/13, 143, 50, 68, 75, 79, 82, 91, 95; 359/332; 370/401; 372/32, 23
See application file for complete search history.

(56) References Cited

U.S. PATENT DOCUMENTS

| | | | |
|---|---|---|---|
| 4,217,036 A * | 8/1980 | Chang ........................ 359/286 |
| 5,221,983 A | 6/1993 | Wagner | |
| 5,491,573 A * | 2/1996 | Shipley ........................ 398/13 |
| 5,663,822 A * | 9/1997 | Fee ............................. 398/95 |
| 5,875,048 A | 2/1999 | Nemecek et al. | |
| 6,081,358 A | 6/2000 | Tiemann et al. | |
| 6,724,994 B1 * | 4/2004 | Collings et al. .............. 398/75 |

FOREIGN PATENT DOCUMENTS

EP    367546    10/1989

* cited by examiner

*Primary Examiner*—David C. Payne
(74) *Attorney, Agent, or Firm*—Browdy and Neimark, PLLC

(57) ABSTRACT

A communication apparatus for use with a light source providing a light beam having a wavelength $\lambda$. The apparatus comprises at least one optical modulator adapted to modulate the light beam to a modulated light signal which comprises at least two additional spectral components, one of which at a wavelength of $\lambda+\Delta\lambda$ and the other at a wavelength of $\lambda-\Delta\lambda$. The apparatus further comprises an optical splitting device adapted for coupling to the at least one optical modulator, for splitting the modulated light signal into at least two similar modulated light signals and at least two optical filters, each adapted to receive one of said at least two similar modulated light signals and to allow one of said at least two additional spectral components to egress therefrom.

8 Claims, 1 Drawing Sheet

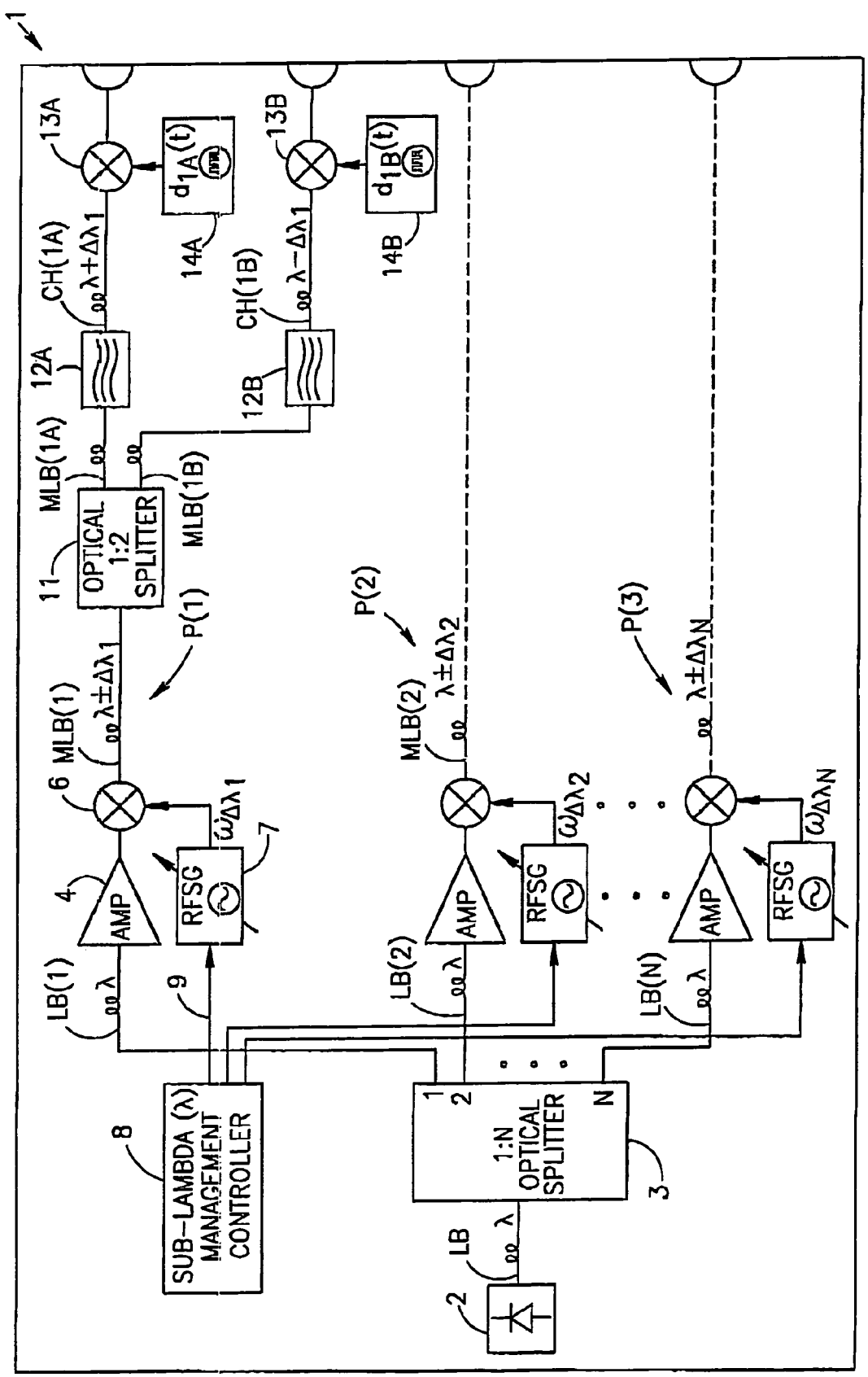
SOLE FIGURE

MULTI WAVELENGTH COMMUNICATION APPARATUS

FIELD OF THE INVENTION

The invention is in the field of optical communications in general, and multi-wavelength communications in particular.

BACKGROUND OF THE INVENTION

In U.S. Pat. No. 5,221,983 to Wagner, there is illustrated and described a double star fiber optic subscriber loop architecture employing two banks of N lasers each for providing each subscriber with two channels including a modulated channel with downstream information and an initially unmodulated channel for subsequent modulation with upstream information. One bank of N lasers produces light beams having wavelengths centered around 1.3 µm for use as the modulated channels. The other bank of N lasers produces light beams having wavelengths centered around 1.5 µm for use as the initially unmodulated channels.

SUMMARY OF THE INVENTION

In accordance with an embodiment of the present invention, there is provided a communication apparatus for use with a light source providing a light beam having a wavelength λ, the apparatus comprising:
  a) at least one optical modulator adapted to modulate the light beam to a modulated light signal which comprises at least two additional spectral components, one of which having a wavelength of λ+Δλ and the other having a wavelength of λ−Δλ;
  b) an optical splitting device adapted for coupling to said at least one optical modulator, for splitting the modulated light signal into at least two similar modulated light signals; and
  c) at least two optical filters, each adapted to receive one of said at least two similar modulated light signals and to allow one of said at least two additional spectral components to egress therefrom.

According to a preferred embodiment of the invention, the communication apparatus further comprises an information modulator adapted to modulate one of the additional spectral components egressing from one of the optical filters.

According to yet another preferred embodiment, the communication apparatus of the invention further comprises at least two information modulators, each adapted to modulate one of said additional spectral components egressing from one of said optical filters. More preferably, each of the information modulators is adapted to modulate a different spectrual component with a different information.

According to another embodiment of the invention, there is provided a multi-wavelength light beam source module for use with a light source providing a light beam having a wavelength λ, the module comprising:
  (One) an 1:N optical splitting device for coupling to the light source for splitting the light beam into at least two light beams; and
  (Two) an array of at least two optical modulators including:
    a) a first optical modulator for modulating one of said at least two light beams to a first modulated light beam including a pair of channels having wavelengths λ±Δλ$_i$, and b) a second optical modulator for modulating another of said at least two light beams to a second modulated light beam including a pair of channels having wavelengths λ±Δλ$_j$ where Δλ$_i$≠Δλ$_j$.

The present invention is based on the notion that components including inter alia a modulator, an optical splitting device, and two or more optical filters can be employed to generate optical carrier channels instead of conventional light sources. The apparatus of the present invention affords for closer channel spacing than hitherto possible in a conventional laser bank arrangement, for example, as implemented in U.S. Pat. No. 5,221,983. This is because all the channels are derived from the same light source, and therefore inherently have the same temperature wavelength stability, and are subject to the same environmental conditions. The apparatus of the present invention can be readily deployed in different networks including inter alia access networks, metropolitan ring networks, and long haul networks.

According to another aspect of the present invention there is provided a method for furnishing a plurality of optical communication channels which comprises the following steps:
  (a) modulating a light beam received from a light source;
  (b) selecting individual spectral components out of a plurality of spectral components obtained by said modulating step; and
  (c) providing a plurality of optical communication channels through utilizing each of said individual spectral components as a separate optical channel.

BRIEF DESCRIPTION OF THE DRAWING

In order to understand the invention and to see how it can be carried out in practice, preferred embodiments will now be described, by way of non-limiting examples only, with reference to the accompanying sole FIGURE which is a schematic representation of a multi-wavelength light beam source module constructed and operative in accordance with the present invention.

DETAILED DESCRIPTION OF THE DRAWING

The FIGURE shows a multi-wavelength light beam source module 1 for use with a laser 2 (constituting a light source) providing a light beam LB having a wavelength λ. The module 1 includes an 1:N optical splitter 3 (constituting an optical splitting device) for splitting the light beam LB into N light beams LB(1), LB(2), . . . , LB(N). Each light beam LB of the N light beams LB(1), LB(2), . . . , LB(N) follows a similar optical path P(1), P(2), . . . , P(N) including amplification by an optical amplifier 4 and then modulation by an optical modulator 6 to generate a modulated light beam MLB including a pair of channels having wavelengths λ±Δλ$_i$. Each optical modulator 6 is preferably of the external modulator type, for example, a crystal modulator, an electro-absorption modulator, and the like. Each optical modulator 6 is driven by a tunable RF signal generator 7 under the control of a Sub-Lambda (λ) Management Controller 8 via a control line 9 for determining the desired wavelengths λ±Δλ$_1$, λ±Δλ$_2$, . . . , λ±Δλ$_n$ of the modulated light beams MLB(1), MLB(2), . . . , MLB(N), respectively.

Depending on the intended deployment of a multi-wavelength light beam source module 1 in an access network, a metro network, and a long haul network, each modulated light beam MLB can be split by a 1:2 optical splitter 11 into two modulated light beams MLB(A), and MLB(B) each including a pair of channels having wavelengths $\lambda \pm \Delta\lambda_i$. Also, the two modulated light beams MLB(A) and MLB(B) can be filtered by narrowband optical filters 12A and 12B for respectively passing a channel CH(1A) having a wavelength $\lambda+\Delta\lambda_i$, and a channel CH(1B) having a wavelength $\lambda-\Delta\lambda_i$. Neither, either one, or both of the channels CH(A) and CH(B) can be modulated by an optical modulator 13 (e.g. resonator) with information from an information source 14.

In the case that neither channel CH(A) nor channel CH(B) is modulated, a module 1 effectively acts as a sub-lambda source. Whilst, in the cases that one or both of the channels CH(A) and CH(B) of the N modulated beams MLB(1), MLB(2), . . . , MLB(N) is modulated, a module 1 effectively acts as a sub-lambda WDM modulator array. In particular, for use in a double star fiber optic subscriber loop architecture, the two channels provided by a single optical modulator having wavelengths $\lambda \pm \Delta\lambda_i$ can be provided to a single subscriber in a similar manner to U.S. Pat. No. 5,221,983, namely, one modulated with downstream information and the other initially unmodulated for subsequent modulation with upstream information.

While the invention has been described with respect to a limited number of embodiments, it will be appreciated that many variations, modifications, and other applications of the invention can be made within the scope of the appended claims. For example, the 1:N optical splitter can be configured as a single component, or alternatively, as a cascaded splitter arrangement.

The invention claimed is:

1. A communication apparatus for use with a light source providing a light beam having a wavelength $\lambda$, the apparatus comprising:
   (One) an 1:N optical splitting device for coupling to the light source for splitting the light beam into at least two light beams; and
   (Two) an array of at least two optical modulators including:
   i) a first optical modulator adapted to modulate one of said at least two light beams to a first modulated light beam including a pair of channels having wavelengths $\lambda \pm \Delta\lambda_i$, and
   ii) a second optical modulator adapted to modulate another of said at least two light beams to a second modulated light beam including a pair of channels having wavelengths $\lambda \pm \Delta\lambda_j$ where $\Delta\lambda_i \neq \Delta\lambda_j$.

2. The apparatus according to claim 1, wherein each said optical modulator is driven by a tunable RF signal generator under the control of a sub-lambda management controller.

3. The apparatus according to claim 1, and further comprising an optical filter deployed after one of said optical modulators for passing a single channel of said pair of channels.

4. The apparatus according to claim 3 wherein said single channel is modulated with information.

5. The apparatus according to claim 1, and further comprising a second optical splitter deployed after one of said optical modulators and adapted to split said modulated light beam into two modulated light beams each including a pair of channels having wavelengths $\lambda \pm \Delta\lambda_i$, a first optical filter deployed after said second optical splitter for providing a first channel having a wavelength $\lambda+\Delta\lambda_i$, and a second optical filter deployed after said second optical splitter for providing a second channel having a wavelength $\lambda-\Delta\lambda_i$.

6. The apparatus according to claim 5 wherein at least one channel of a said pair of channels is modulated with information.

7. An optical communication system including at least one communication apparatus of claim 1.

8. A method for providing a plurality of optical communication channels in a communication network, which method comprises the following steps:
   (a) modulating a light beam received from a light sources;
   (b) selecting individual spectral components out of a plurality of spectral components obtained by said modulating step;
   (c) splitting said at least one individual spectral component into at least two modulated light signals; and
   (d) providing a plurality of optical communication channels through utilizing at least some of said at least two modulated light signals as separate optical channels.

* * * * *